Figure 11:
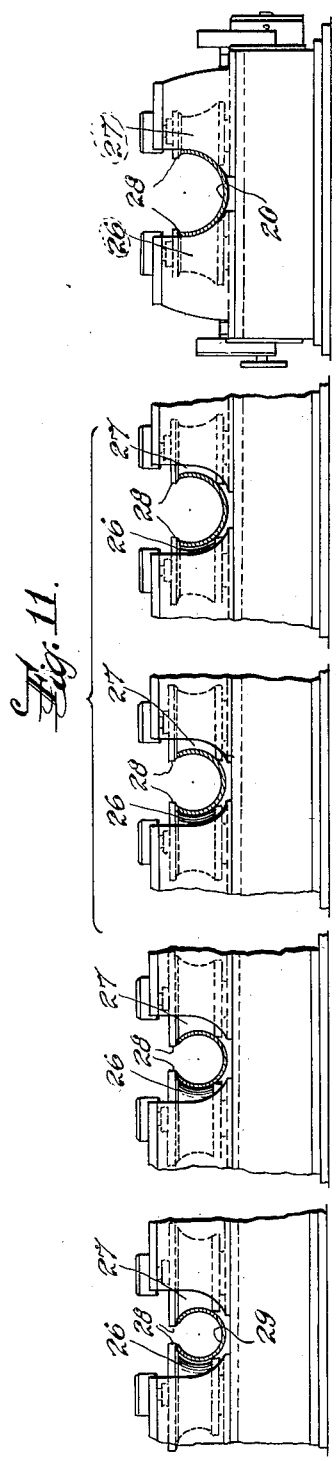

July 9, 1935.    A. RAFTER    2,007,284
BENDING MACHINE FOR MAKING METAL TUBES
Filed Aug. 1, 1933    7 Sheets-Sheet 1
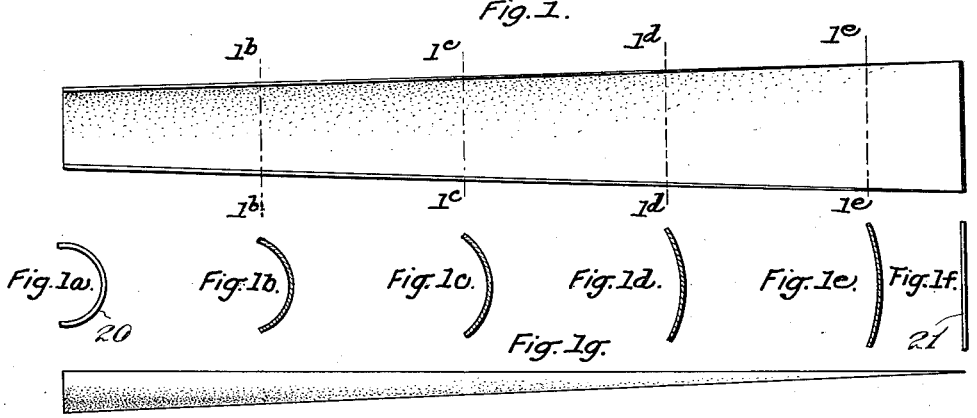
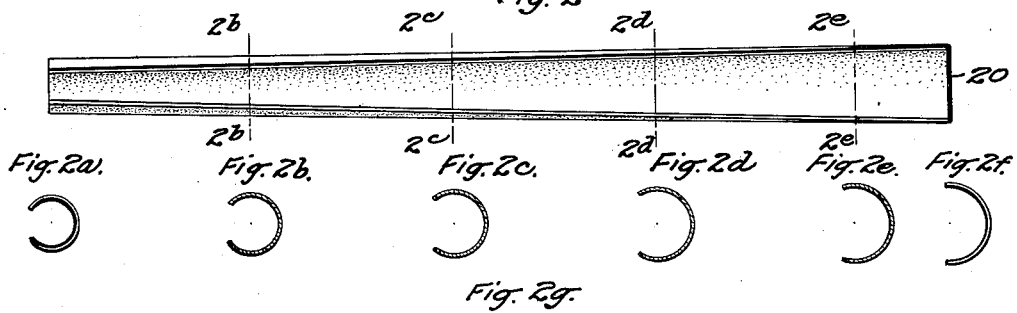
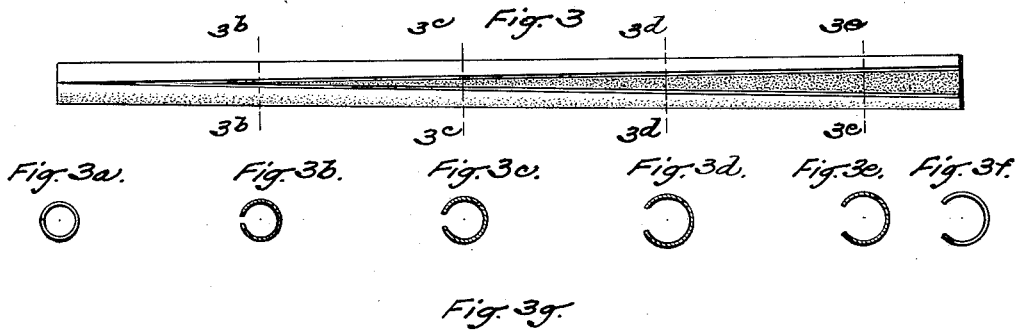
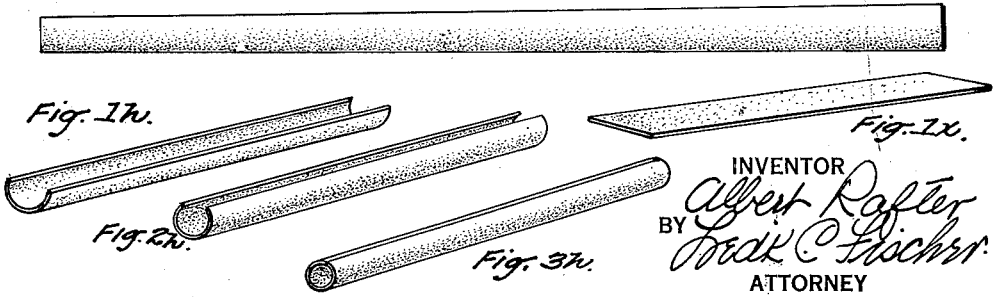
INVENTOR
Albert Rafter
BY Fredk C Fischer
ATTORNEY

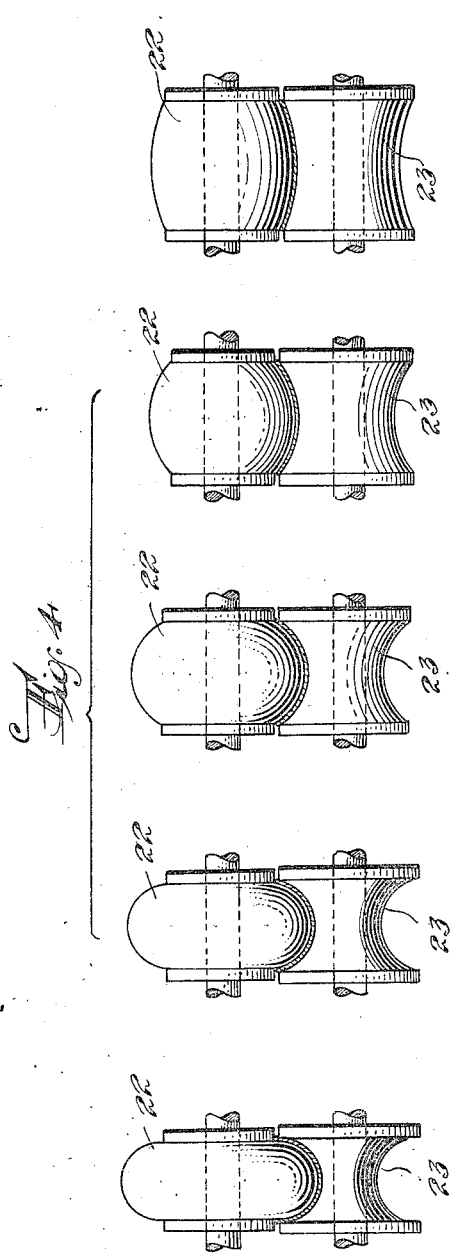
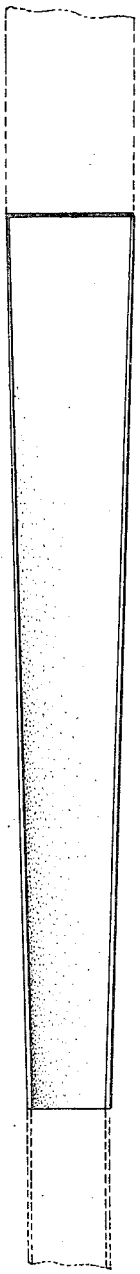
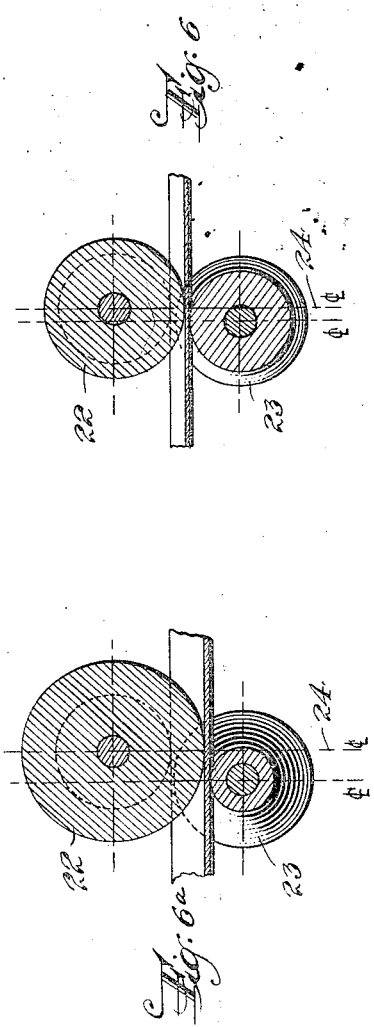

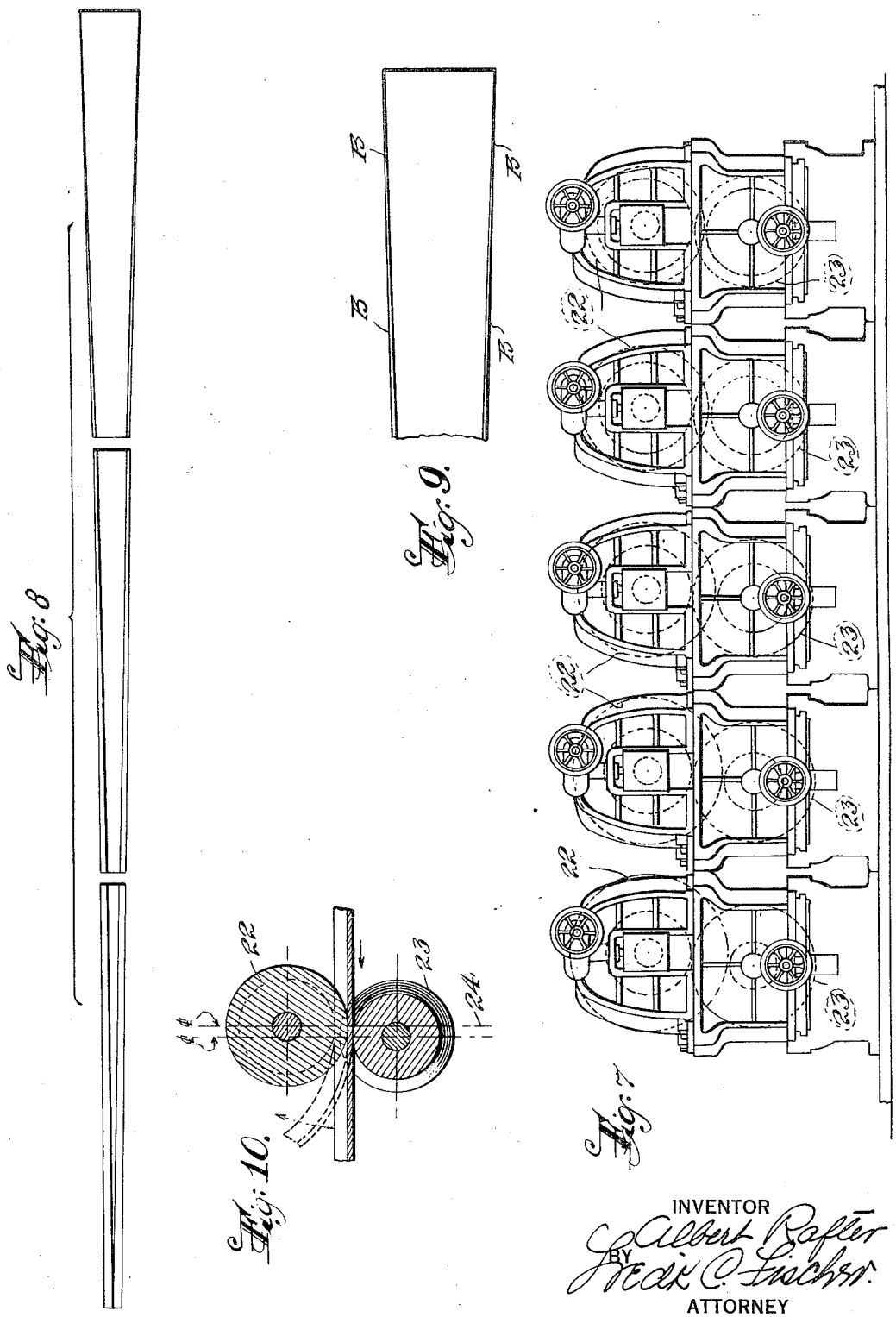

July 9, 1935.  A. RAFTER  2,007,284
BENDING MACHINE FOR MAKING METAL TUBES
Filed Aug. 1, 1933      7 Sheets-Sheet 4

INVENTOR
Albert Rafter
BY Fredk O Fischer
ATTORNEY

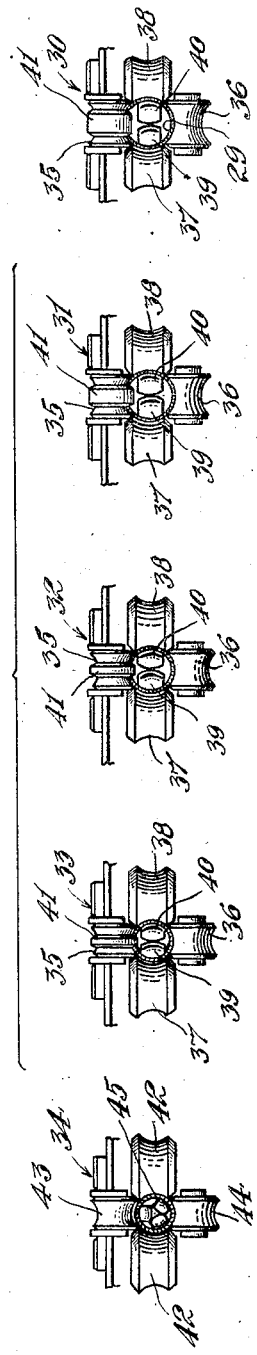
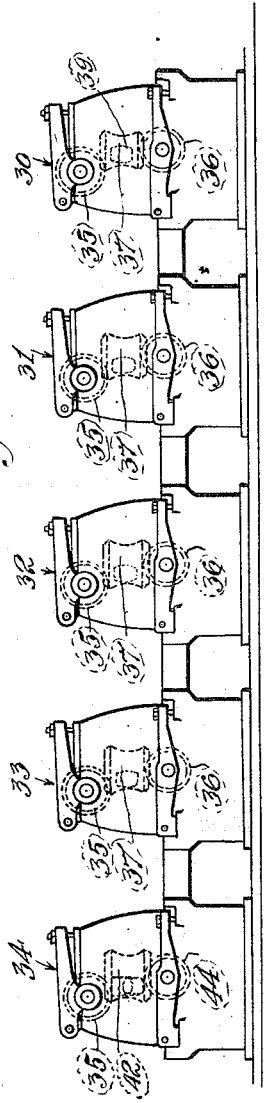

UNITED STATES PATENT OFFICE 2,007,284

BENDING MACHINE FOR MAKING METAL TUBES

Albert Rafter, Glen Ridge, N. J., assignor to Rafter Machine Company, Belleville, N. J., a partnership composed of Albert Rafter and John C. Rafter, Jr.

Application August 1, 1933, Serial No. 683,108

5 Claims. (Cl. 153—54)

This invention relates to metal bending machines, and more particularly to machines for forming metal tubing by means of a plurality of die rolls.

Heretofore, machines for forming metal tubing by passing flat metal sheets through a plurality of die rolls have been objectionable in that the entire forming operation has been performed in a single machine, with the result that metal is greatly distorted and placed under unusual strains due to the vast difference in shape between a flat sheet and the circular tube, both shapes being present at the same time on a unitary sheet of metal in the machine. Such distortions and strains persist in the finished tube and prevent an efficient seam, as the metal has a constant tendency to spring back to its original shape.

A further objection to machines heretofore known is that the die rolls are positioned directly above each other resulting in buckling and undesirable distortion of the metal as it passes through the machine.

It is an object of this invention to provide an apparatus for forming metal tubing by means of die rolls, which apparatus has the die rolls so arranged as to prevent distortional stresses and strains in the metal as it is gradually formed into a tubular shape.

A further object is the provision of an apparatus for forming metal tubing from sheets of metal, which apparatus comprises several machine units having die rolls, the sheets of metal being partially formed in each machine unit.

A further object is the provision of a machine for forming tubing from metal sheets, said machines having die rolls arranged to prevent buckling of the metal sheet or distortions in the edges thereof as the sheet passes through the machine.

A further object is the provision, in a machine for forming metal sheets into desired shapes, of one or more sets of upper and lower horizontal die rolls, the upper die roll in each set having its axis in a vertical plane parallel to but spaced from the vertical plane in which the axes of the lower die roll lie.

A further object is the provision in a machine for forming metal sheets into desired shapes, of one or more sets of power driven vertical die rolls.

A further object is the provision in a machine for forming metal sheets into desired shapes, of one or more sets of power driven vertical die rolls and internal barrel rolls, the internal barrel rolls in each set being positioned slightly in advance of the vertical die rolls so that the metal sheet engages the internal die rolls first and the vertical die rolls have a tendency to wrap the metal sheet about the internal die roll.

These and other advantageous objects which will later appear, are accomplished by the simple and practical construction and arrangement of parts hereinafter described and exhibited in the accompanying drawings, forming part hereof, and in which:

Fig. 1 is a plan view of a metal sheet during the first stage of the forming operation, Fig. 1a is an elevational view of one end of the sheet shown in Fig. 1, Figs. 1b, 1c, 1d, and 1e are sectional views taken on lines 1b—1b, 1c—1c, 1d—1d, and 1e—1e of Fig. 1, Fig. 1f is an elevational view of the opposite end of the sheet shown in Fig. 1, Fig. 1g is a side elevational view of the sheet shown in Fig. 1, Fig. 1h is a perspective view showing the blank after it has emerged from the first forming process. It is now of semicylindrical shape, with parallel sides and edges, Fig. 1x shows the original blank of metal which is flat in cross-section, with parallel sides, before being run through the forming process, Fig. 2 is a plan view of the sheet during the second stage of the operation, Fig. 2a is an elevational view of one end of the sheet shown in Fig. 2, Figs. 2b, 2c, 2d, and 2e are sectional views taken on lines 2b—2b, 2c—2c, 2d—2d, and 2e—2e of Fig. 2, Fig. 2f is an elevational view of the opposite end of the sheet shown in Fig. 2, Fig. 2g is a side elevational view of the sheet shown in Fig. 2, Fig. 2h is a perspective view showing the blank after it has emerged from the first stage of the forming process; the blank now being almost circular in cross-section with its sides and edges parallel, Fig. 3 is a plan view of the sheet during the third stage of the forming operation, Fig. 3a is an elevational view of one end of the sheet shown in Fig. 3, Figs. 3b, 3c, 3d and 3e are sectional views taken on lines 3b—3b, 3c—3c, 3d—3d and 3e—3e of Fig. 3, Fig. 3f is an elevational view of the opposite end of the sheet shown in Fig. 3, Fig. 3g is a side elevational view of the sheet shown in Fig. 3, Fig. 3h shows the blank after it has passed through the third stage of the forming operation and is now in a completed condition; and is in the form of a tube of equal cross-section throughout its entire length.

Figure 13:
Figure 12:
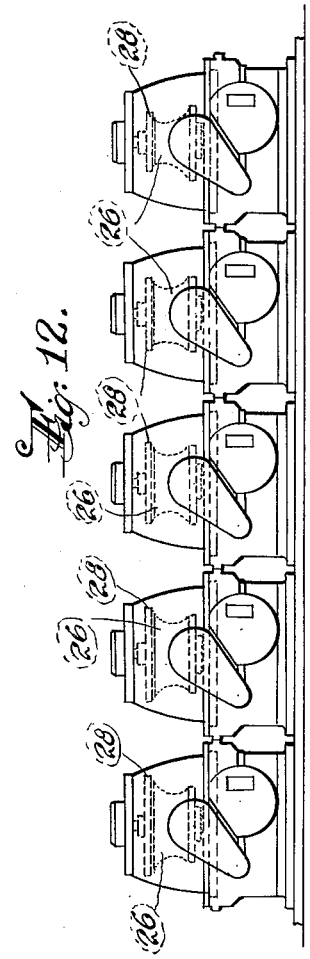
Figure 17:
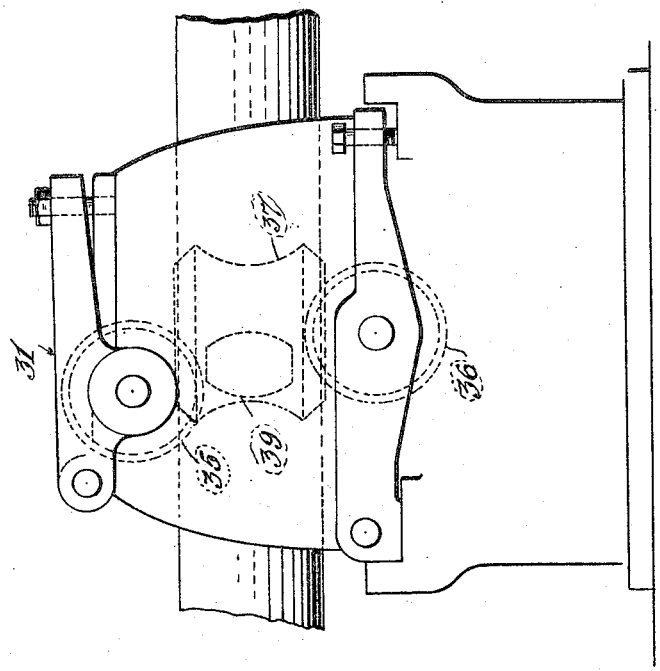
Figure 18:
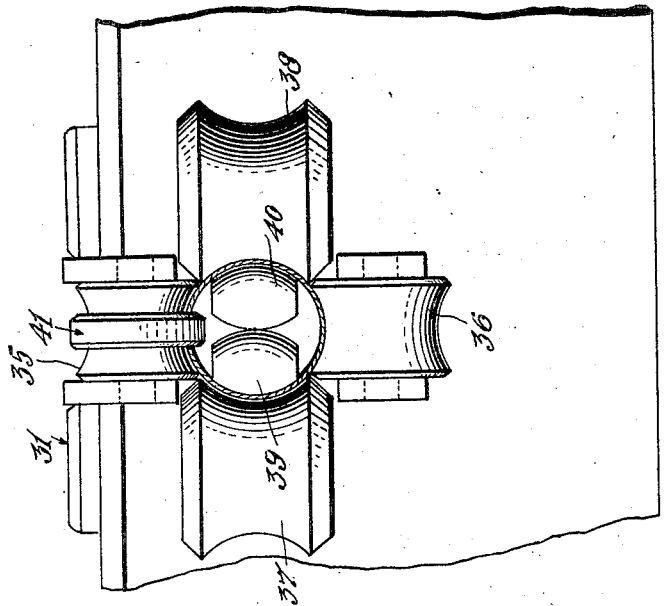
Figure 10:
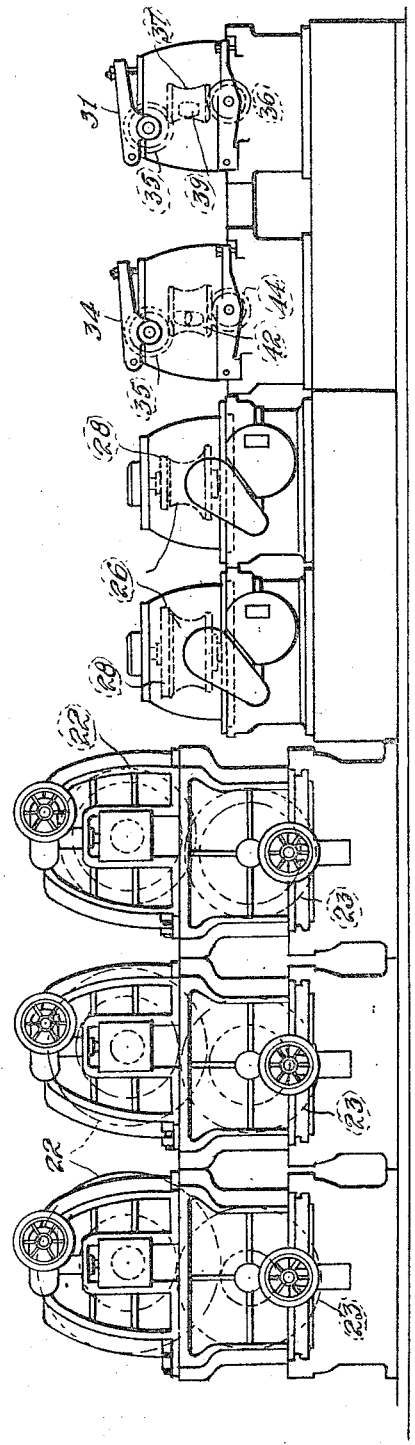

Fig. 4 shows various shapes of the die rolls during the first stage of the forming operation, Fig. 5 is a plan view of a sheet of metal as it would appear in the machine from the first to the last set of die rolls during the first stage of the forming operation, Fig. 6 shows a sectional view of the die rolls in the machine used in the first stage of the operation, showing the manner in which the upper and lower die rolls have their centers offset in increasing degree in the direction in which the sheet of metal travels, Fig. 6a shows a similar view, showing a later stage of the operation, Fig. 7 is an elevational view of the machine having a plurality of units of upper and lower horizontal die rolls as used in the first stage of the tube forming operations, Fig. 8 is a diagrammatic plan view showing the gradually forming of a flat sheet of metal into a tubular shape in the three stages of forming operations, Fig. 9 shows the absence of scallops due to the offsetting of the centers of the die rolls, Fig. 10 shows the manner in which a sheet of metal tends to warp upwardly (as shown in dotted lines) when passed between two die rolls having their axes offset in different vertical planes, thereby compensating for the tendency of the sheet to warp downwardly and resulting in a straight sheet of metal as shown in full lines, Fig. 11 shows various shapes of vertical die roll units used during the second stage of the forming operation, Fig. 12 is an elevational view of the machine with vertical die rolls used during the second stage of the forming operation, Fig. 13 is a plan view of the sheet while in the machine from the first to the last set of vertical die rolls during the second stage, Fig. 14 shows the shapes and arrangements of a plurality of die roll units used during the third stage of the forming operation, Fig. 15 is an elevational view of the machine used during the third stage of the forming operation, Fig. 16 is a plan view of a sheet of metal in the machine during the third stage of the forming operation, Fig. 17 is an enlarged view of a set of die rolls in the third machine unit, showing the manner in which the internal barrel rolls are advanced in reference to the power driven vertical rolls, Fig. 18 is an enlarged view of a die roll set used in the third machine unit showing the arrangement of horizontal, vertical and internal barrel die rolls, and Fig. 19 is a diagrammatic elevational view of a metal forming apparatus in which three machine units are interconnected so that the metal sheet will pass therethrough without interruptions.

According to my invention, a flat metal sheet is formed into a circular tube in three distinct and separate stages of operations. During the first stage, the flat metal sheet is introduced into a machine having a series of horizontal upper and lower die rolls to form the metal into a substantially semicylindrical shape as shown in Fig. 1, the cross-section of the sheet when it leaves the machine being slightly greater than a semicircle as shown at 20 in Fig. 1a, the initial cross-section of the sheet being straight as shown at 21. The machine comprises a plurality of horizontal die roll units, each unit having an upper die roll 22 and a lower die roll 23, the center 24 of the upper die roll being offset from a vertical line passing through the center 25 of the lower die roll as shown in Fig. 6. This offsetting of the centers of the upper and lower die rolls, prevents downward bending and buckling of the metal as it passes between the die rolls, as diagrammatically indicated in Fig. 10, and also prevents distortions and irregularity in the edges of the metal sheet.

The first unit of upper and lower die rolls have their centers offset about three inches, and in each succeeding unit the amount of offsetting is gradually increased until the last unit is reached, where the amount of offsetting is about six inches. The dimensions herein given are not restrictive, but are presented merely as an example.

Heretofore, without the offsetting of the upper and lower die rolls, the flanges on each die roll unit, upon contacting the metal sheet, have produced scallops and distortions in the edges of the sheet. In Fig. 9, at B, is indicated the straight and undistorted edges resulting from offsetting of the die rolls.

In Fig. 10 is indicated the manner in which a sheet normally tends to bend downward when the upper and lower die rolls have their axes in a common vertical plane. When the axes of the die rolls are offset as shown in Fig. 6, there is a tendency to bend the sheet upward, which compensates for the normal downward bending tendency, and results in a straight undistorted sheet.

This feature is of great importance in producing a finished tube with the edges straight and parallel as is necessary in order to provide an efficient seam which has no tendency to spread due to distortions and inherent stresses and strains in the metal.

After the flat metal sheet has been formed into a substantially semicylindrical shape in the first stage machine, the semicylindrical shape is then introduced into a second machine for the second stage of operations. The second stage machine comprises a plurality of die roll units, each unit consisting of a pair of power driven vertical die rolls 26, 27, and each vertical die roll has an upper flange 28, which engages the edges of the partially cylindrical metal sheet to prevent rocking or shifting of the metal sheet, as it passes through the machine. During the second stage the metal initially has the slightly greater than semicylindrical shape as shown at 20 in Fig. 1a, and when it passes through the last die roll unit in the second stage, the metal has been formed into the shape shown at 29, Fig. 2a.

The metal is then introduced into the third stage machine, which comprises die roll units 30, 31, 32, 33, 34. Units 30, 31, 32, 33, each have a pair of upper and lower die rolls, 35, 36, a pair of vertical die rolls 37, 38, and a pair of barrel rolls 39, 40. The upper die rolls are each provided with a flange 41, which engages the edges of the partially tubular metal shape to prevent shifting and rocking of the metal shape as it passes through the machine. The upper and lower die rolls have offset centers arranged as explained in connection with the machine for the first stage of operations, and for the same purposes, that is, to prevent buckling and distortion of the edges. The barrel rolls 39, 40 are placed within the partially tubular shape to resist the pressure of the external horizontal and vertical die rolls to prevent tendencies of the metal from caving in.

It will be noted that the internal barrel rolls are in advance of the vertical die roll, that is, the metal engages the internal barrel roll of each set before it engages the power driven vertical die rolls. By means of this arrangement the vertical rolls in each set have a tendency to "wrap" the metal around the internal barrel rolls, and thus compensate for any outward flaring tendencies of the metal as would be the case were the internal barrel rolls and the vertical rolls engaged simultaneously by the metal.

In the third stage machine, the last die roll unit comprises a pair of vertical rolls 42, an upper die roll 43, a lower die roll 44, and three barrel rolls 45. The upper die roll 43 has no flange, and has its center offset from a vertical line through the center of the lower die roll 44, for the purpose above explained. As the metal passes through the last die roll unit, it is completely formed into a tubular shape, the barrel rolls preventing a possibility of the shape being crushed in by the vertical and horizontal die rolls.

Referring to the plan view of the metal sheet in Fig. 1 it will be seen that the sheet converges from its flat shape to the partially cylindrical shape at a relatively sharp angle. In Fig. 2 referring to the plan view, it will be noted that the angular convergence decreases; and in Fig. 3, the plan view shows a very slight angular convergence.

This gradual decrease in the angular convergence as the tubing passes through the second and third stage machines, greatly reduces distortional effects and excessive strains on the metal. Were the final tubular shape to be made directly from the flat sheet, it is obvious that there would be a very large angular convergence and also very large distortional stresses and strains.

While I have described my apparatus with especial application to the forming of cylindrical metal tubing, it is obvious that my improvement can be advantageously used in the forming of flat metal sheets into various shapes by means of die rolls. The arrangement of the upper and lower horizontal die rolls in each set, so that their axes are in different vertical planes to prevent distortion of the metal and the regular edges, clearly may be advantageously used in the formation of any shape from metal sheets. Also, my arrangement of the internal barrel rolls in advance of the vertical power driven rolls obviously can be advantageously applied in the formation of various shapes, as this arrangement compensates for distortional effects and irregularities in the metal where the shape being formed is cylindrical or otherwise.

Where the apparatus comprises several machine units, that is, the flat sheet is passed through one unit to partially form the metal, and then through another unit to further form the metal, and finally through a third unit to completely form it to a desired shape, it is preferable that the end of the sheet leaving the first machine unit be introduced first into the second machine unit, and also the end of the sheet leaving the second machine unit be introduced first to the third machine unit. This procedure compensates for slightly rolling distortions due to the metal sheet being passed constantly in the same direction.

While I have described the apparatus as comprising three separate machine units, it is obvious that all of the machine units can be joined together and the metal sheet passed continuously through the apparatus without in any manner departing from the spirit of the invention.

From the above description it will be seen that I have provided an effective apparatus for forming cylindrical tubes from flat metal sheets without unusual stresses and strains which might tend to cause the edges of the tube to spring apart. Also I have provided means to prevent buckling of the metal and distortion of the edges thereof, as the metal sheet passes through the various machines.

The foregoing disclosure is to be regarded as descriptive and illustrative only, and not as restrictive or limitative of the invention, of which obviously an embodiment may be constructed including many modifications, without departing from the general scope herein indicated and denoted in the appended claims.

Having thus described my invention, what I claim as new and desire to secure by Letters Patent, is:

1. In an apparatus for forming flat metal sheets into cylindrical tubes, a first machine unit having a plurality of sets of upper and lower die rolls to form a metal sheet into a substantially semicylindrical shape, a second machine unit having a plurality of sets of vertical die rolls to receive the semicylindrical shape from the first machine unit and to further form the sheet into a partially cylindrical shape, and a third machine unit having a plurality of sets of vertical and horizontal die rolls, each of said last-named sets also having a plurality of barrel rolls, the metal sheet being completely formed in the third machine unit to a cylindrical tube.

2. In an apparatus for forming flat metal sheets into cylindrical tubes, a first machine unit having a plurality of sets of upper and lower die rolls to partially form the metal sheet, said upper die rolls having their axes offset from vertical planes in which the axes of the lower die rolls are positioned, a second machine unit having a plurality of sets of vertical die rolls to receive the partially formed metal sheet from the first machine unit and to further form the sheet, said vertical die rolls having their upper portions flanged to engage the edges of the sheet to prevent rotation and shifting of the sheet, and a third machine unit having a plurality of sets of vertical and horizontal die rolls, each of said last-named sets also having a plurality of barrel rolls, the metal sheet being completely formed in the third machine unit to a cylindrical tube.

3. In an apparatus for forming flat metal sheets into cylindrical tubes, a machine comprising a plurality of die roll sets, each of said sets having a pair of vertical die rolls and a pair of horizontal die rolls and having also a plurality of barrel rolls, each of the upper horizontal die rolls except in the last set having a centrally positioned flange to engage the edges of a partially cylindrical metal sheet passing through the machine to prevent shifting and rotation of the sheet.

4. In an apparatus for forming flat metal sheets into cylindrical tubes, a machine comprising a plurality of die roll sets, each of said sets having a pair of vertical die rolls and a pair of horizontal die rolls and having also a plurality of barrel rolls, the horizontal die rolls in each set having their axes lying in different vertical planes.

5. In an apparatus for forming metal sheets into desired shapes, a set of opposed power driven vertical die rolls, and internal barrel rolls, said barrel rolls being positioned in advance of the vertical rolls so that the metal will engage the internal barrel rolls before engaging the vertical rolls.

ALBERT RAFTER.